United States Patent [19]

Mochikawa et al.

[11] Patent Number: 5,182,701
[45] Date of Patent: Jan. 26, 1993

[54] THREE-PHASE PWM INVERTER PROVIDING AN IMPROVED OUTPUT SINUSOIDAL WAVEFORM

[75] Inventors: Hiroshi Mochikawa; Tatsuya Hirose, both of Yokkaichi; Taki Horiguchi, Higashi, all of Japan

[73] Assignee: Kabushiki Kaisha Toshiba, Kanagawa, Japan

[21] Appl. No.: 732,837

[22] Filed: Jul. 19, 1991

[30] Foreign Application Priority Data

Jul. 20, 1990 [JP] Japan .................................. 2-190467
Jul. 20, 1990 [JP] Japan .................................. 2-190468

[51] Int. Cl.⁵ ........................................ H02M 7/5387
[52] U.S. Cl. ........................................ 363/98; 363/95
[58] Field of Search ................... 363/95, 96, 97, 98

[56] References Cited

U.S. PATENT DOCUMENTS

| | | | |
|---|---|---|---|
| 4,720,777 | 1/1988 | Yokoi | 363/96 |
| 4,722,042 | 1/1988 | Asano et al. | 363/96 |
| 4,800,478 | 1/1989 | Takahashi | 363/98 |
| 4,847,743 | 7/1989 | Kamiyama | 363/98 |
| 4,924,373 | 5/1990 | Inaba et al. | 363/95 |
| 4,994,950 | 2/1991 | Gritter | 363/98 |
| 4,994,956 | 2/1991 | Kirchberg et al. | 363/95 |
| 5,001,619 | 3/1991 | Nakajima et al. | 363/96 |

FOREIGN PATENT DOCUMENTS

0338798A2 10/1989 European Pat. Off. .
0351783A2 1/1990 European Pat. Off. .
0371442A1 6/1990 European Pat. Off. .

Primary Examiner—Steven L. Stephan
Assistant Examiner—Jeffrey Sterrett
Attorney, Agent, or Firm—Limbach & Limbach

[57] ABSTRACT

In an inverter in which six switching elements of an inverter main circuit is controlled to be turned on and off under a switching pattern in which a voltage space vector composed of adjacent two of six fundamental voltage vectors out of phase from one another by an electrical angle of $\pi/3$ and a zero vector figures a circular locus so that a three-phase substantially sinusoidal voltage is obtained, a three-phase PWM signal generating device includes a circuit in which two switching patterns of the same kind are formed before and after the formation of the switching pattern corresponding to the zero vector, respectively, a circuit in which the switching pattern corresponding to the zero vector is held for half of its holding time when the voltage space vector passes an intermediate phase position between the two adjacent fundamental voltage vectors, and a circuit in which when the magnitude of the command voltage vector exceeds the region of a circular locus figured by the fundamental voltage vector, the command voltage vector is converted to a new command voltage vector so as to meet the region.

9 Claims, 15 Drawing Sheets

THREE-PHASE PWM INVERTER PROVIDING AN IMPROVED OUTPUT SINUSOIDAL WAVEFORM

BACKGROUND OF THE INVENTION

This invention relates generally to an inverter device having a plurality of switching elements turned on and off so that a dc voltage is converted to a three-phase ac voltage, and more particularly to a pulse width modulation (PWM) signal generating device for the inverter device provided for controlling on and off operations of each switching element in accordance with a time ratio so that a substantially sinusoidal output voltage is obtained.

One conventional pulse width modulation (PWM) signal generating circuit in an inverter device will be described. FIG. 18 schematically illustrates an arrangement of an inverter main circuit 10 of the inverter device. Six switching elements $13u$, $13v$, $13w$, $13x$, $13y$ and $13z$ are bridge-connected between main circuit bus lines 11 and 12 as well known in the art. Since either of the upper and the lower-switching elements of each of the three arms is turned on, these three switches turned on are referred to as reference symbols Sa, Sb and Sc respectively. The number of switching patterns is thus obtained as $2^3 = 8$. Each phase voltage is $\pm V/2$ with respect to a virtual neutral point. Where voltage space vectors correspond to three-phase instantaneous voltages in consideration of phase differences among the phases, each of the switching elements Sa, Sb, Sc is represented as "1" when the positive switching element $13u$, $13v$ or $13w$ in each phase is turned on. Each of the switching elements Sa, Sb, Sc is represented as "0" when the negative switching elements $13x$, $13y$ or $13z$ in each phase is turned on. Accordingly, each switching pattern can be represented by substituting "1" or "0" for each of Sa, Sb, Sc. As shown by solid lines in FIG. 19, these switching patterns can be represented as six fundamental voltage vectors out of phase from one another by an electrical angle of $2\pi/6$ and two zero vectors (0, 0, 0) and (1, 1, 1).

FIG. 20 illustrates the three-phase PWM signal generating device for on-off control of the switching elements in the above-described inverter device. Phase command value classification means 14 classifies a phase command value $\theta^*$ into unit regions obtained by dividing an electrical angle of $2\pi/6$ into twelve equal parts, for example and calculates an lead angle in the unit region into which the phase command value is classified. The result of classification and the calculated lead angle are produced as 4-bit information. Switching pattern determining means 15 is provided for determining the switching patterns corresponding to two kinds of fundamental voltage vectors (voltage space vectors) nearest to the unit region to which the phase command value $\theta^*$ classified by the phase command value classification means 14 belongs and the switching pattern corresponding to the zero vector. The fundamental voltage vectors are out of phase from each other by an electrical angle of $\pi/3$. The switching pattern determining means 15 further determines a sequence that these determined switching patterns are delivered to the base terminals of the switching elements $13u$–$13z$. Generally, two kinds of fundamental voltage vectors of the phases nearest to the phase command value $\theta^*$ as exemplified in FIG. 19 and the vectors (1, 0, 0), (1, 1, 0) and the zero vector are specified as the switching patterns in the example of FIG. 19. One of two kinds of zero vectors (1, 1, 1) and (0, 0, 0) is selected so that the number of the switching operations becomes the smallest in consideration of the previous switching patterns.

The voltage space vectors which can be outputted must lie inside a hexagon formed by linking the points of six fundamental voltage vectors in FIG. 19 where the voltage space vectors each having a predetermined magnitude and phase are outputted by controlling the fundamental voltage vectors out of phase from each other by an electrical angle of $2\pi/6$ and the zero vector in accordance with the time ratio. Accordingly, the region of the modulation to the sinusoidal waves performed by the above-mentioned control of the fundamental voltage vectors and zero vector is limited to the inside of an inscribed circle of the hexagon. Consequently, polar coordinates can be employed to realize optional voltage space vectors in the limit region and the region of an electrical angle of $\pi/6$ can be described in consideration of the symmetry.

FIG. 21 shows enlarged fundamental voltage vectors (1, 0, 0), (1, 1, 0) and the zero vector. In order that the voltage space vector corresponding to a command voltage vector including the phase command value $\theta^*$ and voltage command value $V^*$ is outputted, it is obvious that the following expression needs to be satisfied by the geometric analysis shown in FIG. 21:

$$V \sin(\pi/6 - \theta) : V \sin(\pi/6 + \theta) : 1 - V\{\sin(\pi/6 - \theta) + \sin(\pi/6 + \theta)\} = t_1 : t_2 : t_0 \qquad (1)$$

where $t_1$, $t_2$ and $t_0$ are output times of the fundamental voltage vectors (1, 0, 0), (1, 1, 0) and the zero vector and $\theta$ is a lead angle of the phase command value $\theta^*$ in the unit region to which the phase command value $\theta^*$ belongs.

Holding time calculating means 16 is provided for obtaining the output times $t_1$, $t_2$ as shown in FIG. 20. More specifically, data of the lead angle $\theta$ is supplied to ROM tables 17 and 18 from the phase command classification means 14 so that the value of $\sin(\pi/6 + \theta)$ corresponding to the supplied lead angle is obtained. The holding time $t_1$ of the switching pattern corresponding to the fundamental voltage vector (1, 0, 0) is obtained by multiplying one control period $T_{SW}$ by the voltage command value $V^*$ and further by the value of $\sin(\pi/6 - \theta)$. In the same way, the holding time $t_2$ of the switching pattern corresponding to the fundamental voltage vector (1, 1, 0) is obtained by multiplying one control period $T_{SW}$ by the voltage command value $V^*$ and further by the value of $\sin(\pi/6 + \theta)$. The holding time $t_0$ of the switching pattern corresponding to the zero vector is obtained by subtracting these holding periods $t_1$ and $t_2$ from the one control period $T_{SW}$. One control period refers to a period in which the switching patterns corresponding to the two kinds of fundamental voltage vectors and the zero vector respectively are sequentially produced once.

Timing means 19 comprises a presettable counter 20, a switch 21 and a D-type flip flop 22. The presettable counter 20 has a data input terminal DATA to which data of each of the holding times $t_0$, $t_1$, $t_2$ is inputted in accordance with the switching of the switch 21. The presettable counter 20 also has a clock terminal CK to which clock signals fck are inputted. The switch 21 is switched to an output terminal of the holding time corresponding to the switching pattern determined by the switching pattern determining means 15 when timing of each of the holding times supplied to the presettable counter 20 is completed and then, the subsequent holding time data is inputted to the data input terminal DATA. The flip flop 22 holds the formation state of the corresponding switching pattern until the timing of each holding time is completed, whereby the switching elements 13u-13z of the inverter device are desirably controlled to be turned on and off.

FIG. 22 illustrates a locus of a vector $\psi$ representative of a magnetic flux induced in a three-phase induction motor M as a three-phase load when an output of the inverter main circuit 10 controlled by the above-described PWM signal generating device is supplied to the motor M. Reference symbol $\psi'$ designates a mean locus and figures a circular orbit. The magnetic flux vector $\psi$ is represented as the time integral of the voltage space vector. Since each fundamental voltage vector has a predetermined value, the direction of the magnetic flux vector $\psi$ is the same as that of each fundamental voltage vector and the magnitude of the vector $\psi$ is proportional to the holding time of each fundamental voltage vector.

A manner of determining the output sequence of the switching patterns by the switching pattern determining means 15 will now be described. The output holding times $t_1$, $t_2$ of the switching pattern corresponding to the two fundamental voltage vectors determined by the switching pattern determining means 15 are calculated by the holding time calculating circuit 16. The output sequence of the switching patterns is so determined that the zero vector is interposed between longer vectors, that is, the zero vector is positioned at the start or the end of the vector with the longer holding time in one control period $T_{SW}$. Generally, since the holding time of the fundamental voltage vector with the phase nearest to the phase command value $\theta^*$ becomes longer because of the method of calculating the holding time, the switching pattern corresponding to the fundamental voltage vector with the longer holding time can be determined at the stage of the classification by the phase command value classification means 14.

FIG. 22 shows the case where the phase command value $\theta^*$ is in the condition shown in FIG. 21. The phase command value $\theta^*$ when $t_1 < t_2$ is nearest to the fundamental voltage vector (1, 1, 0) where the holding times of the switching patterns corresponding to the fundamental voltage vectors (1, 0, 0), (1, 1, 0) and the zero vector are represented as $t_1$, $t_2$, $t_0$, respectively. Accordingly, the switch 21 is switched so that the sequence of ... $t_1$, $t_2$, $t_0$, $t_0$, $t_2$, $t_1$ ... is repeated.

The above example will be described in more detail. When the switching pattern corresponding to the fundamental voltage vector (1, 0, 0) is held for the time $t_1$ in the previous control period, the switching pattern corresponding to the fundamental voltage vector (1, 0, 0) is held for the time $t_1$ in the following control period and then, the switching pattern corresponding to the fundamental voltage vector (1, 1, 0) is held for the time $t_2$ and last, the switching pattern corresponding to the zero vector (1, 1, 1) is held for the time $t_0$.

One of problems to be solved in the above-described inverter device is that further improvement in the degree of approximation of the voltage waveform to the sinusoidal wave by the PWM control has been desired. A second problem is that the magnetic flux and torque of the motor connected to the inverter device are biased in a unit region transition portion between the two kinds of fundamental voltage vectors in the prior art shown in FIGS. 18–22, which makes it difficult to stably control the motor. The second problem will be described in detail later. A third problem is that the waveform distortion of output voltage of the inverter device to which the voltage command value V* is supplied is increased since the magnitude of the inverter output voltage is $\sqrt{3}/2$ times larger than the maximum PWM controllable voltage. More specifically, the principle in this control system is that a carrier voltage signal Va and a sinusoidal wave voltage signal Vb are compared and a PWM signal is obtained in accordance with the magnitude of each signal. When the amplitude of the sinusoidal wave voltage signal is excessively increased in this control system, the amplitude in the vicinity of its peak cannot be accurately converted to its corresponding time length, resulting in an increase in the waveform distortion.

The above second problem will be described in detail. Referring to FIG. 23, the phase command value $\theta^*_1$ belongs to the unit region $R_1$ and the phase command value $\theta^*_2$ belongs to the unit region $R_2$ with lapse of time. The magnetic flux vector is translocated with the increase in the phase as shown in FIG. 24. More specifically, the relation of $t_1 > t_2$ holds with respect to the phase command value $\theta^*_1$ belonging to the unit region $R_1$ within the control period $T_{SW}$ where the output times of the switching patterns corresponding to the fundamental voltage vectors (1, 0, 0), (1, 1, 0) and the zero vector are represented as $t_1$, $t_2$, $t_0$ respectively. Accordingly, the switching pattern corresponding to the zero vector (0, 0, 0) is first held for the time $t_0$ and then, the switching pattern corresponding to the longer fundamental voltage vector (1, 0, 0) is held for the time $t_1$ and last, the switching pattern corresponding to the shorter fundamental voltage vector (1, 1, 0) is held for the time $t_2$.

The relation of $t_1 < t_2$ holds when the phase command value $\theta^*_2$ belongs to the unit region $R_2$ in the subsequent control period $T_{SW}$, as shown in FIG. 12. Accordingly, the switching pattern corresponding to the zero vector (1, 1, 1) is held for the time $t_0$. The switching pattern corresponding to the longer fundamental voltage vector (1, 1, 0) is then held for the time $t_2$ and last, the switching pattern corresponding to the shorter fundamental voltage vector (1, 0, 0) is held for the time $t_1$. In this case the mean locus $\psi'$ of the magnetic flux vector figures a circular orbit as obvious from FIG. 24.

FIG. 25 illustrates a torque waveform where the magnetic flux vector moves as shown in FIG. 24. The torque waveform is increased when the phase leads an ideal state and decreased when the phase lags behind it. Accordingly, the torque is increased during the times $t_1$, $t_2$ of the formation state of the fundamental voltage vectors and decreased during the time $t_0$ of the formation of the zero vector. Consequently, the torque takes such a distorted waveform as shown in FIG. 25 in the transition of the unit region, resulting in a large torque ripple.

FIG. 26 shows another method of selecting the fundamental voltage vectors in the transition of the unit region. When the transition of the unit region occurs with respect to the phase command value $\theta^*$ belonging to the unit region $R_1$ after the switching pattern corresponding to the fundamental voltage vector (1, 1, 0) is held for the time $t_2$, the switching pattern corresponding to the fundamental voltage vector (1, 0, 0) is held for the time $t_1$ with respect to the phase command value $\theta^*_2$ belonging to the unit region $R_2$ during the subsequent control period $T_{SW}$. The switching pattern corresponding to the fundamental voltage vector (1, 1, 0) is then held for the time $t_2$ and the switching pattern corresponding to the zero vector (1, 1, 1) is held for the time $t_0$. The torque waveform in this control method is shown in FIG. 27. Although the distortion of the torque waveform can be improved, the distortion of the actual magnetic flux vector locus relative to an ideal means locus of the magnetic flux is increased instead, resulting in variations in the magnetic flux. Since the distortion of the torque or magnetic flux thus occurs both in the method in FIG. 24 and in the method in FIG. 26, these methods entail a problem in the stable control of the motor. Further, it is understood that the above-described problem can always be seen in the transition of the unit region positioned in the middle of two different fundamental voltage vectors.

SUMMARY OF THE INVENTION

Therefore, a primary object of the present invention is to provide a PWM signal generating device for an inverter device wherein the improvement in the degree of approximation of the inverter output voltage waveform to the sinusoidal waveform can be enhanced substantially over the whole PWM control range.

Another object of the invention is to provide a PWM signal generating device for an inverter device which can prevent the occurrence in the distortion of the magnetic flux and the torque of a motor connected to the inverter main circuit.

Further another object of the invention is to provide a PWM signal generating device for an inverter device wherein the distortion of the inverter output voltage waveform near its peak can be improved when the voltage command value is excessively large.

One aspect of the present invention resides in an inverter device comprising an inverter main circuit including six bridge-connected switching elements which can be turned on and off in predetermined patterns so that a dc voltage supplied from an external source is converted to a three-phase ac approximately sinusoidal voltage and a three-phase PWM signal generating device connected to the inverter main circuit for generating switching pattern signals for turning on and off the switching elements in order to provide six kinds of switching patterns corresponding to six fundamental voltage vectors out of phase from one another by an electrical angle of $2\pi/6$, respectively, and switching patterns corresponding to a zero vector corresponding to an "on" or "off" state of substantially all the switching elements so that the inverter main circuit generates an approximately sinusoidal output voltage waveform.

The three-phase PWM signal generating device according to one aspect of the invention comprises phase command value classification means for classifying a phase command value $\theta^*$, pertaining to a voltage command value $V^*$, into one of a plurality of unit regions, calculating a lead angle in the one unit region into which the phase command value is classified, and generating corresponding output information representative of the result of the classification and the lead angle, wherein the phase command value classification means obtains the plurality of unit regions by dividing an electrical angle of $2\pi$ into a plurality of equal regions.

Further included in the three-phase PWM signal generating device is switching pattern determining means supplied with the output information of the phase command value classification means for setting the switching patterns corresponding to two kinds of fundamental voltage vectors corresponding to the one unit region to which the phase command value is classified and the zero vector, the fundamental voltage vectors being out of phase from each other by an electrical angle of $\pi/3$, the switching pattern determining means further setting an output sequence of the set switching patterns, the switching pattern determining means inserting the switching pattern corresponding to the zero vector into each of the two kinds of switching patterns once during formation of each of the two kinds of switching patterns. Holding time calculating means supplied with the output information of the phase command value classification means calculate a holding time of each of the switching patterns corresponding to the two kinds of fundamental voltage vectors and the zero vector, based on the lead angle of the phase command value $\theta^*$ belonging to the one unit region and the supplied voltage command value $V^*$, and generate signals representative of the calculated holding times. Timing means supplied with the signals representative of the calculated holding times and connected to the switching pattern determining means holds a formation state of each set switching pattern calculated by the holding time calculating means.

In accordance with the above-described arrangement, the switching pattern corresponding to the zero vector wherein the output voltage of the inverter main circuit is decreased substantially to zero is inserted into each of the two fundamental voltage vectors per control period. Consequently, since the on and off control of the switching elements can be performed accurately, the voltage ripple and the torque ripple can be reduced in the range to the maximum PWM controlled voltage.

In other aspect of the invention, the three-phase PWM signal generating device comprises phase command value classification means for classifying a phase command value $\theta^*$, pertaining to a voltage command value $V^*$, into one of a plurality of unit regions, calculating a lead angle in the one unit region into which the phase command value is classified, and generating corresponding output information representative of the result of the classification and the lead angle, wherein the phase command value classification means obtains the plurality of unit regions by dividing an electrical angle of $2\pi$ into a plurality of equal regions. Switching pattern determining means supplied with the output information of the phase command value classification means sets the switching patterns corresponding to two kinds of fundamental voltage vectors corresponding to the one unit region to which the phase command value is classified and the zero vector, the fundamental voltage vectors being out of phase from each other by an electrical angle of $\pi/3$. The switching pattern determining means further sets an output sequence of the set switching patterns and forms the zero vector state at the times of the start and end of a section in which the calculated lead angle of the phase command value $\theta^*$ advances $\pi/3$ and at the time of a change-over of the unit region so that the sum of the holding time of the zero vectors formed two times becomes approximately equal to the holding time of the other zero vector.

Holding time calculating means supplied with the output information of the phase command value classification means calculates a holding time of each of the switching patterns corresponding to the two kinds of fundamental voltages vectors and the zero vector, based on the lead angle of the phase command value $\theta^*$ belonging to the one unit region and the supplied voltage command value V*, and generates signals representative of the calculated holding times. Timing means supplied with the signals representative of the calculated holding times and connected to the switching pattern determining means holds a formation state of each set switching pattern during the holding time of each switching pattern calculated by the holding time calculating means. Lastly, unit region change-over determining means connected between the phase command value classification means and the switching pattern determining means determines that the phase command value $\theta^*$ has transferred from a unit region in the vicinity of one of the two kinds of fundamental voltage vectors.

In accordance with the above-described arrangement, the zero vector state is provided at least three times at different times during one control period. The sum of the holding times of the switching patterns corresponding to two of the three zero vectors is approximately equaled to the holding time of the switching pattern corresponding to the other zero vector. As a result, the zero vector is formed when the voltage space vector passes the intermediate position of the two fundamental voltage vectors out of phase from each other by $2\pi/6$ and the holding time of the switching pattern corresponding to the zero vector is determined to be a part of the holding time of the switching pattern corresponding to the zero vector given in one control period. Consequently, radial and tangential deviations of the magnetic flux vector can be reduced when the fundamental voltage vector given the longer holding time is switched from one to the other, which can reduce the torque and magnetic flux distortions of the motor.

In yet another aspect of the invention, the three-phase PWM signal generating device comprises switching pattern determining means for determining a holding time of each of the six kinds of switching patterns and an output sequence of the switching patterns, based on a command voltage vector including a supplied voltage command value V* and a supplied phase command value $\theta^*$, and command voltage vector substituting means for supplying to the switching pattern determining means a first command voltage vector, instead of a command voltage vector received from an external source, when the command voltage value of the received command voltage vector exceeds a PWM control region where the fundamental voltage vector is a radius, the first command voltage vector being nearest to the limit of the PWM control region.

In accordance with the above-described arrangement, even when a excessively large voltage command value is supplied, it can be replaced by a new command voltage vector with the maximum PWM controlled voltage. Since the switching pattern signals are generated in accordance with the replaced voltage vector, the waveform distortion near the peak of the ac voltage can be prevented.

Other objects of the present invention will become obvious upon understanding of the description of the preferred embodiments and the appended claims. Various advantages not referred to herein will occur to one skilled in the art upon employment of the invention in practice.

DESCRIPTION OF THE PREFERRED EMBODIMENTS

Figure 1:
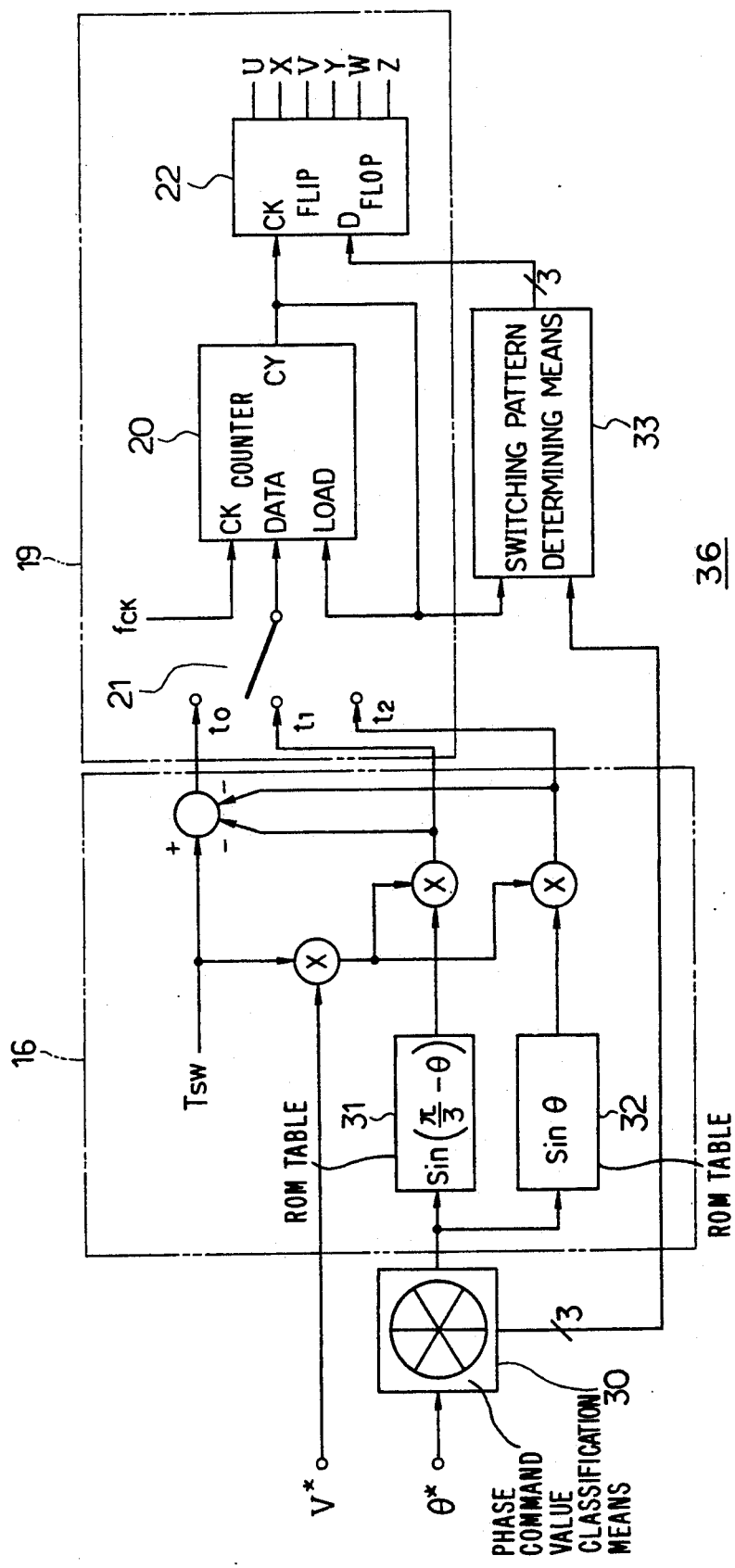
FIG. 1 is a block diagram of the three-phase PWM signal generating device of a first embodiment of the invention.
Figure 20:
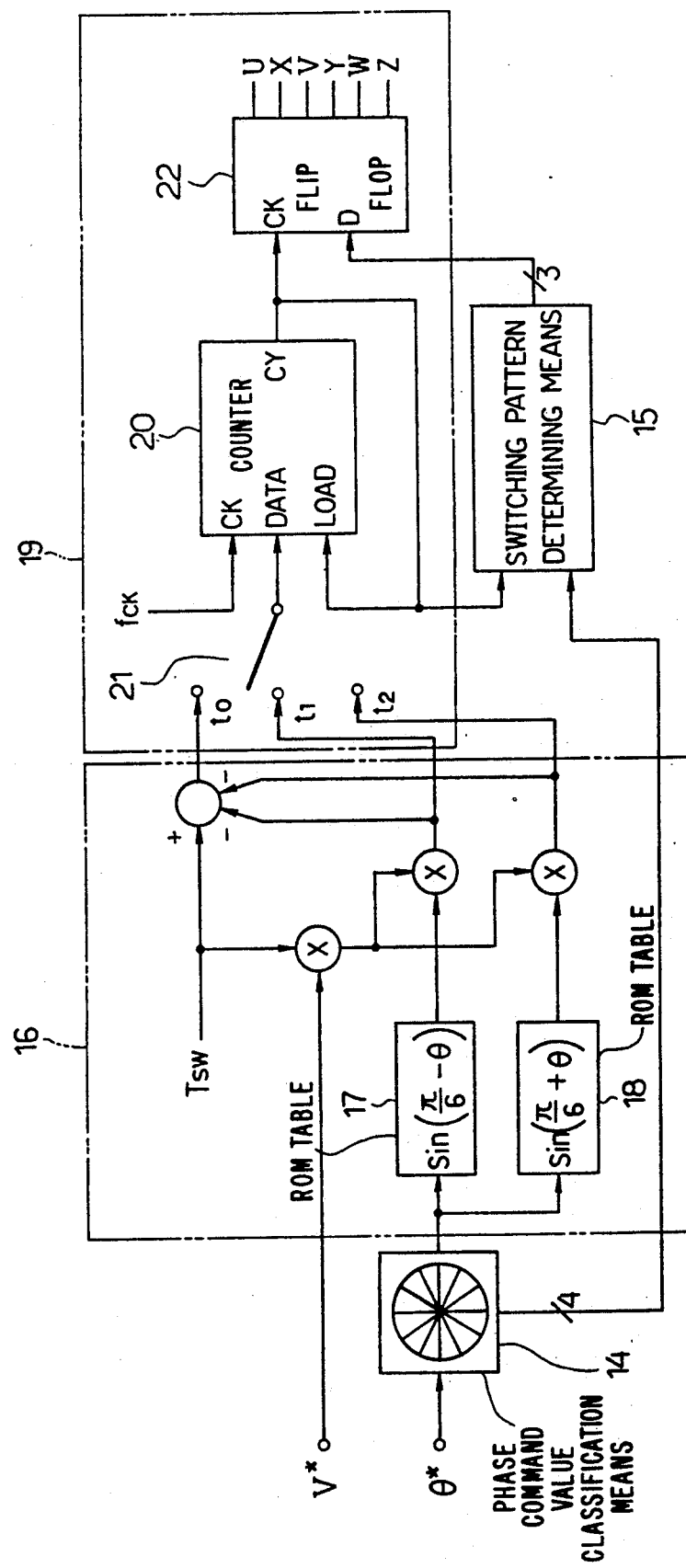
FIG. 20 is a block diagram of a conventional three-phase PWM signal generating device.

A first embodiment of the three-phase PWM signal generating device in accordance with the present invention will be described with reference to FIGS. 1 to 3 of the accompanying drawings. The same parts are labeled by the identical reference numerals in FIG. 1 showing the three-phase PWM signal generating device 36 for the on and off control of the switching elements 13u–13z of the inverter main circuit in FIG. 18 as in FIG. 20. Phase command value classification means 30 in the embodiment classifies the supplied phase command value $\theta^*$ into any one of unit regions obtained by dividing an electrical angle of $2\pi$ into six equal regions. The result of classification by the phase command value classification means 30 is delivered as 3-bit information. Further, the phase command value classification means 30 calculates and delivers a lead angle $\theta$ in the classified unit region. With these operations of the phase command value classification means 30, the following equation (2) as a transformation of the above-mentioned equation (1) is set in ROM tables 31 and 32:

$$V^* \sin\left(\frac{\pi}{3} - \theta\right) : V^* \sin \theta : 1 - \quad (2)$$

$$V^* \left( \sin\left(\frac{\pi}{3} - \theta\right) + \sin \theta \right) = t_1 : t_2 : t_0$$

Figure 2:
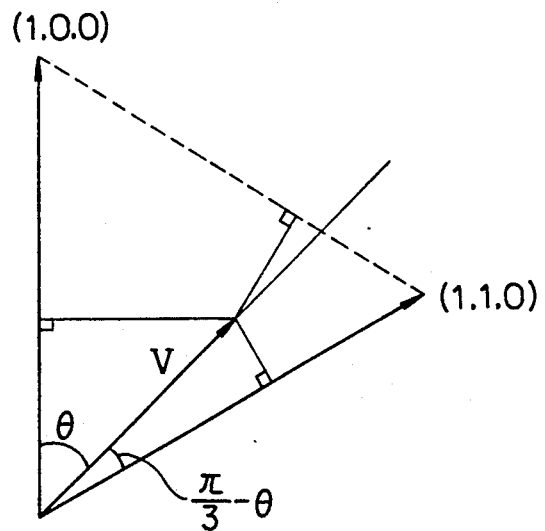
FIG. 2 is a vector diagram for explaining the operation of the three-phase PWM signal generating device.
Figure 3:
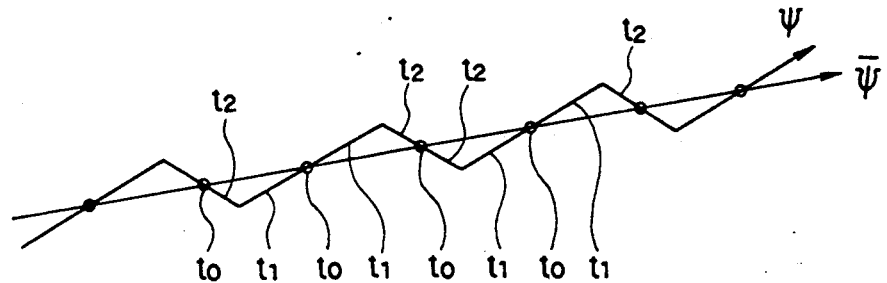
FIG. 3 shows a locus of the magnetic flux vector in the first embodiment.
Figure 21:
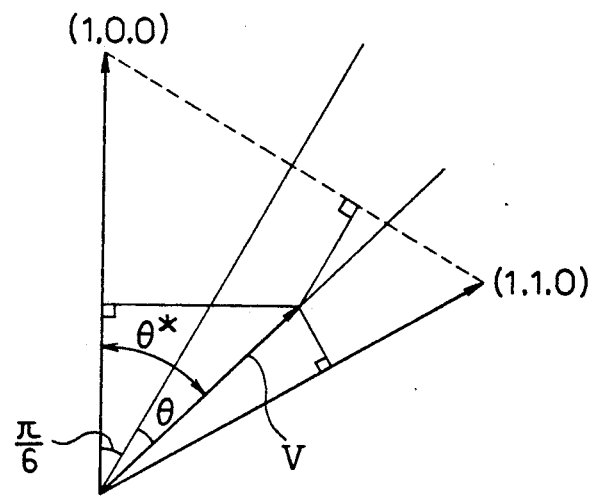
FIG. 21 is a vector diagram for explaining the sinusoidal waveform approximating operation of the three-phase PWM signal generating device in FIG. 20.
Figure 22:
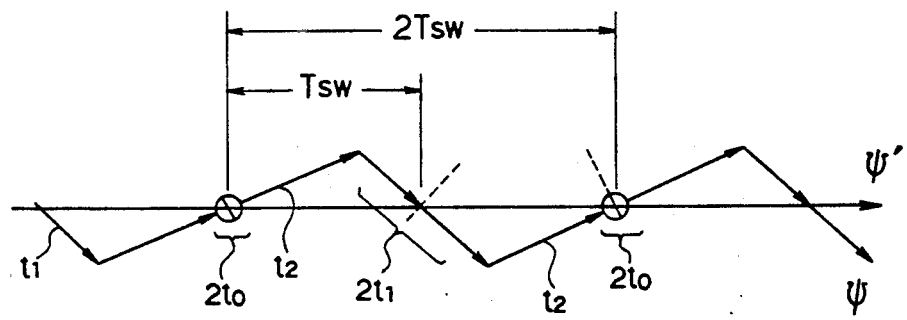
FIG. 22 shows a locus of the magnetic flux vector obtained from the sinusoidal waveform approximation by the conventional device.

FIG. 2 is a view similar to FIG. 21 showing a basis of the equation (2).

Switching pattern determining means 33 is arranged so that switching patterns corresponding to two kinds of fundamental voltage vectors corresponding to the unit region classified by the phase command value classification means 30 and the switching pattern corresponding to the zero vector are delivered in a sequence of ($t_1$, $t_0$, $t_1$), ($t_2$, $t_0$, $t_2$), expressing those switching patterns using the respective holding times thereof. Referring to FIG. 3, the switching pattern corresponding to the fundamental voltage vector (1, 0, 0) is held for time $t_1$ and then, the switching pattern corresponding to the zero vector (0, 0, 0) is held for time $t_0$. Subsequently, the switching pattern corresponding to the fundamental voltage vector (1, 0, 0) is again held for time $t_1$ and then, the switching pattern corresponding to the fundamental voltage vector (1, 1, 0) is held for time $t_2$. Subsequently, the switching pattern corresponding to the zero vector (1, 1, 1) is held for the time $t_0$ and then, the switching pattern corresponding to the fundamental voltage vector (1, 1, 0) is again held for the time $t_2$. The switching pattern corresponding to the zero vector is always inserted once while the switching pattern corresponding to the fundamental voltage vector is delivered twice. In this case the switching pattern determining means 33 selects the zero vector (0, 0, 0) not the zero vector (1, 1, 1) in the movement from the fundamental voltage vector to the zero vector. This is because only one switching operation is needed when the switching pattern corresponding to the fundamental voltage vector (1, 0, 0) is transferred to the switching pattern corresponding to the zero vector (0, 0, 0), whereby the switching loss is reduced to the minimum so that efficient operation is performed.

In accordance with the above-described embodiment, the maximum output voltage of the inverter device can be increased to a value equal to the maximum PWM controlled voltage though it is only $\sqrt{3}/2$ of the maximum PWM controlled voltage in the conventional three-phase PWM signal generating device. Further, the phase command value $\theta^*$ is classified into one of the six unit regions and the switching pattern corresponding to the zero vector is always inserted during formation of each of the switching patterns corresponding to the two kinds of fundamental voltage vectors. Consequently, the approximation of the inverter output voltage waveform to the sinusoidal waveform can be improved, which can reduce the current ripple or torque ripple.

Figure 4:
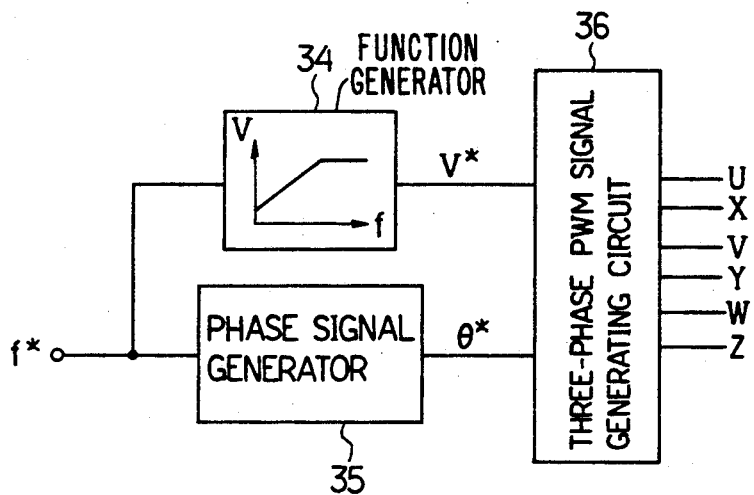
FIG. 4 is a block diagram of the three-phase PWM signal generating device of a second embodiment of the invention.

FIG. 4 illustrates a second embodiment wherein the invention is applied to an inverter of the type that the voltage-to-frequency ratio is controlled so as to be constant. The reference numeral 36 in FIG. 4 designates a three-phase PWM signal generating device such as shown in FIG. 1. When supplied with a frequency command value $f^*$, a voltage command value $V^*$ corresponding to the supplied frequency command value $f^*$ is delivered to the three-phase PWM signal generating device 36 by a function generator 34 and the phase command value $\theta^*$ is delivered to the three-phase PWM signal generating device 36 by a phase signal generator 35 in the same manner as in the first embodiment.

Figure 5:
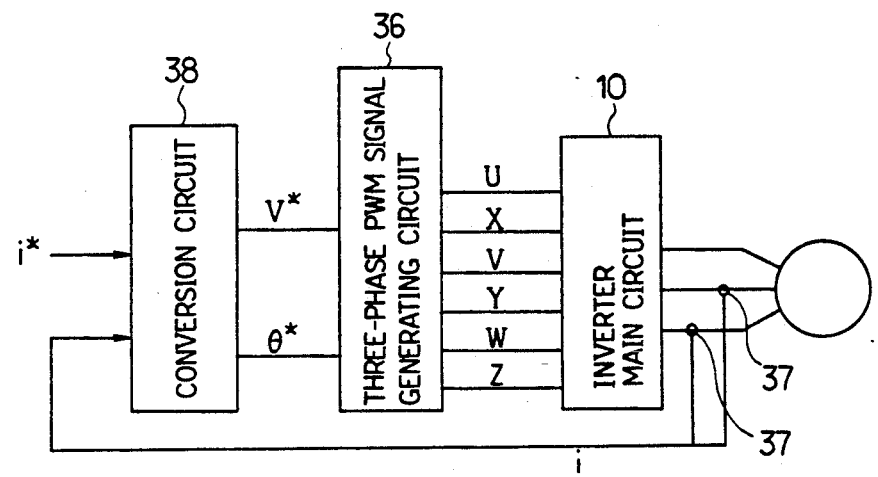
FIG. 5 is a block diagram of the three-phase PWM signal generating device of a third embodiment of the invention.
Figure 18:
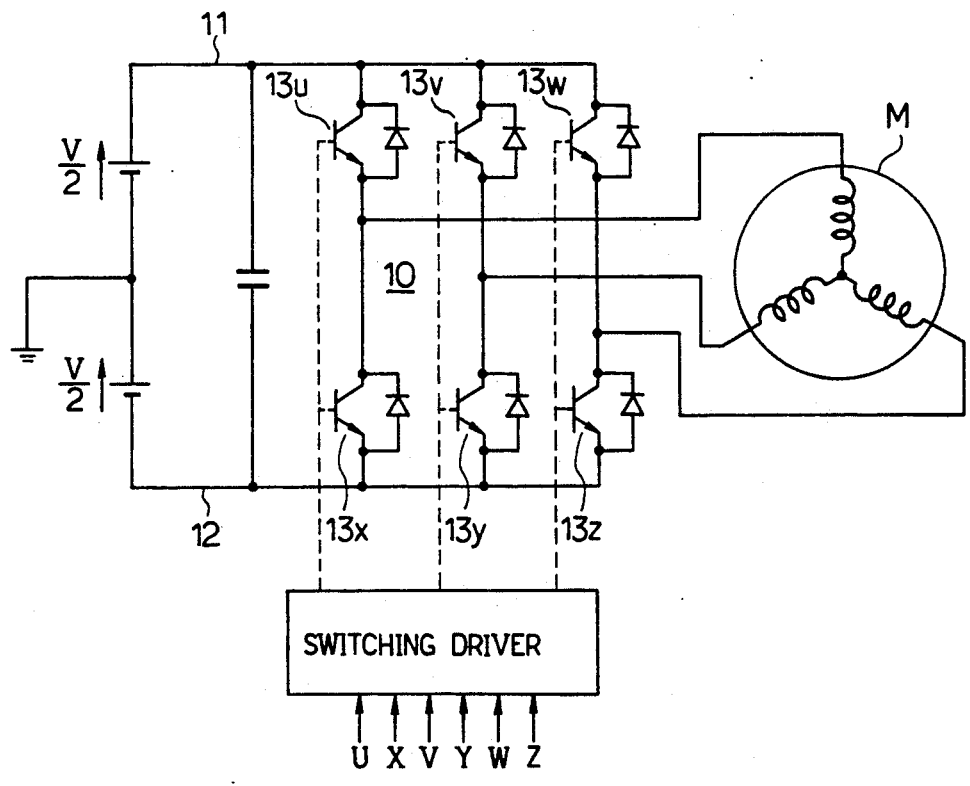
FIG. 18 is a connection diagram of a three-phase inverter main circuit.
Figure 19:
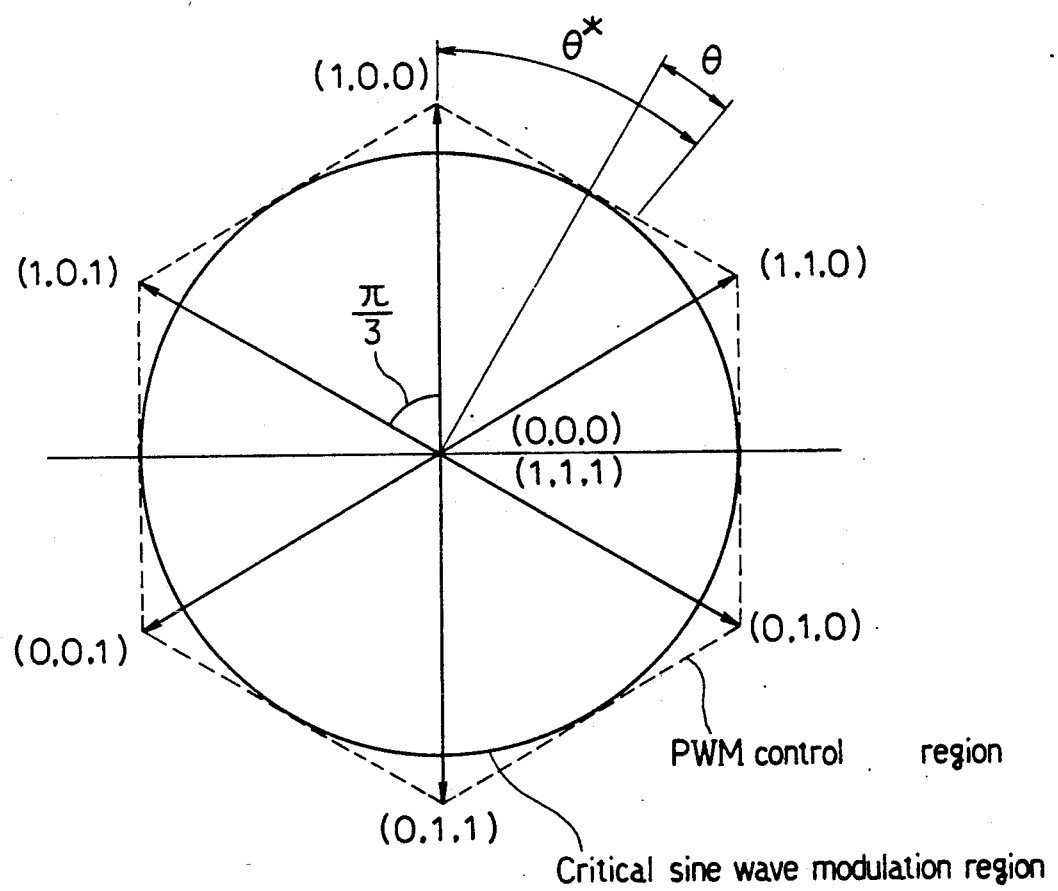
FIG. 19 is a diagram of fundamental voltage vectors for explaining the operation of generating the three-phase PWM signals.

FIG. 5 illustrates a third embodiment wherein the invention is applied to an inverter of the current follow-up type. When a detection current value i detected by a current detector 37 provided at the output side of the inverter main circuit 10 having the same configuration as shown in FIG. 18 and a current command value i* are supplied to a conversion circuit 38, these values are converted to the voltage command value V* and the phase command value $\theta^*$, both of which command values are supplied to the three-phase PWM signal generating device 36. Since a voltage space vector having an optional voltage and phase can be realized in a time is twice the control period $T_{SW}$, the present invention may be applied to high-speed current control when high switching frequency elements are employed.

Figure 6:
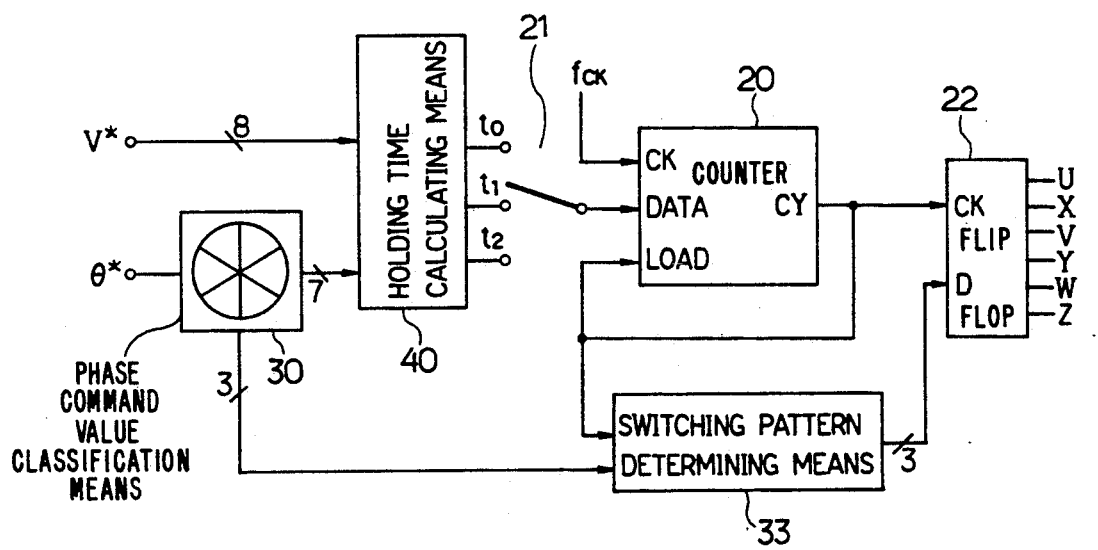
FIG. 6 is a block diagram of the three-phase PWM signal generating device of a fourth embodiment of the invention.

FIG. 6 illustrates a fourth embodiment. The fourth embodiment differs from the first embodiment in that the holding time calculating means 40 is composed into a function table by the use of a ROM. In this case even when an 8-bit voltage command value V* and an 7-bit lead angle $\theta$ are inputted and 10 bits are assigned to each of the holding times $t_0$, $t_1$, $t_2$ to be outputted, the memory capacity required of ROM is 960 kilobits, which shows that the ROM can be realized by one memory IC of 1 megabit.

Figure 7:
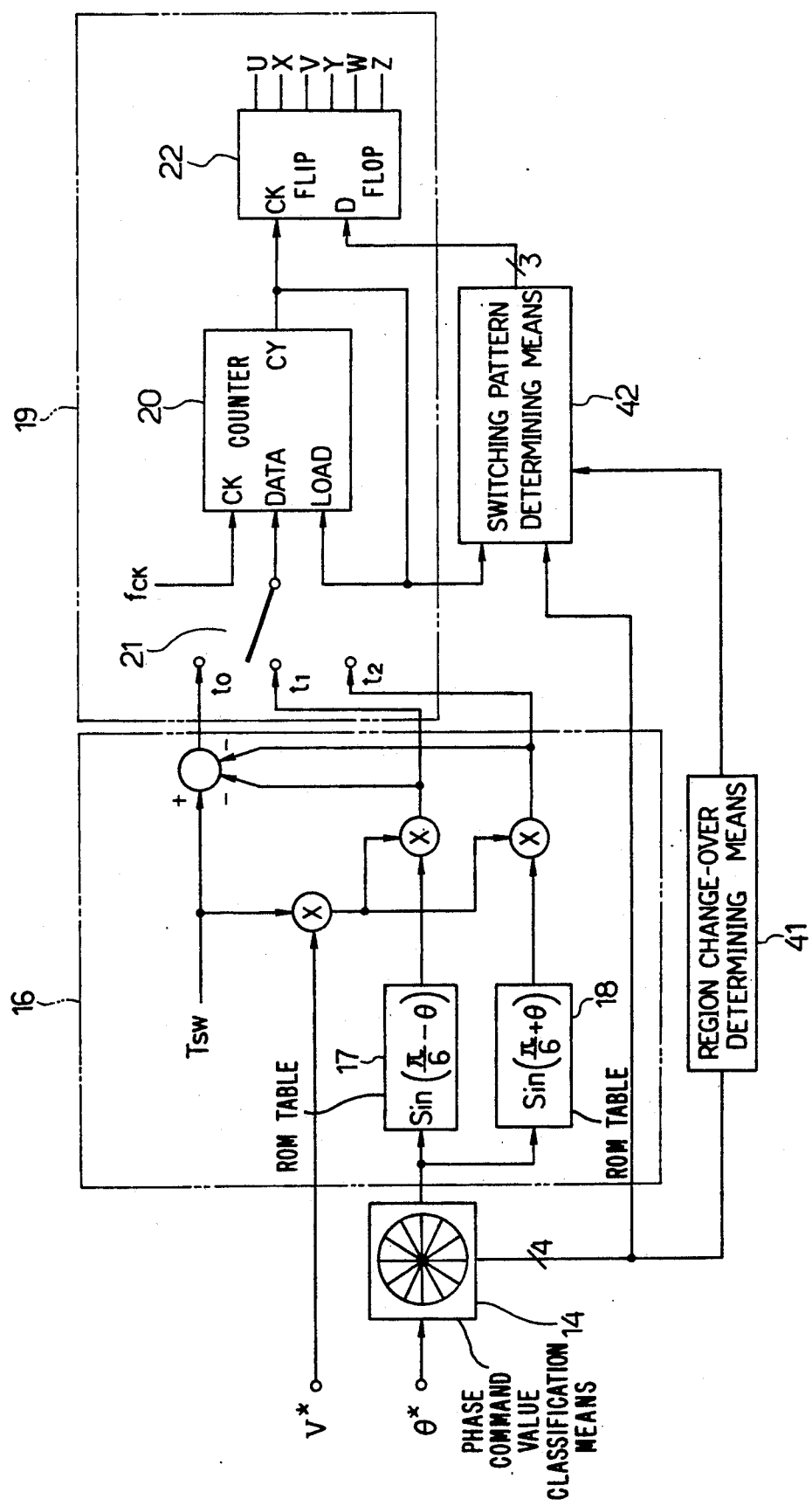
FIG. 7 is a block diagram of the three-phase PWM signal generating device of a fifth embodiment of the invention.

A fifth embodiment of the invention will be described with reference to FIGS. 7–10. The three-phase PWM signal generating device in FIG. 7 is provided with unit region change-over determining means 41 and the switching pattern determining means 42 has a special arrangement. The other arrangement is the same as the arrangement shown in FIG. 20.

The control pattern in the embodiment is the same as in the above-described prior art, that is, the phase command value classification means 14 classifies the unit region obtained by dividing an electrical angle of $2\pi$ into two equal parts, to which unit region the supplied phase commamd value $\theta^*$ belongs. In accordance with the result of classification, the switching patterns corresponding to the two kinds of fundamental voltage vectors and that corresponding to the zero vector and the output sequence of these switching patterns are determined by the switching pattern determining means 42. The holding times of the respective switching patterns are determined by the holding time calculating circuit 16 and the switching patterns are held by the timing means 19 until the timing operations of the respective holding times are completed.

Figure 8:
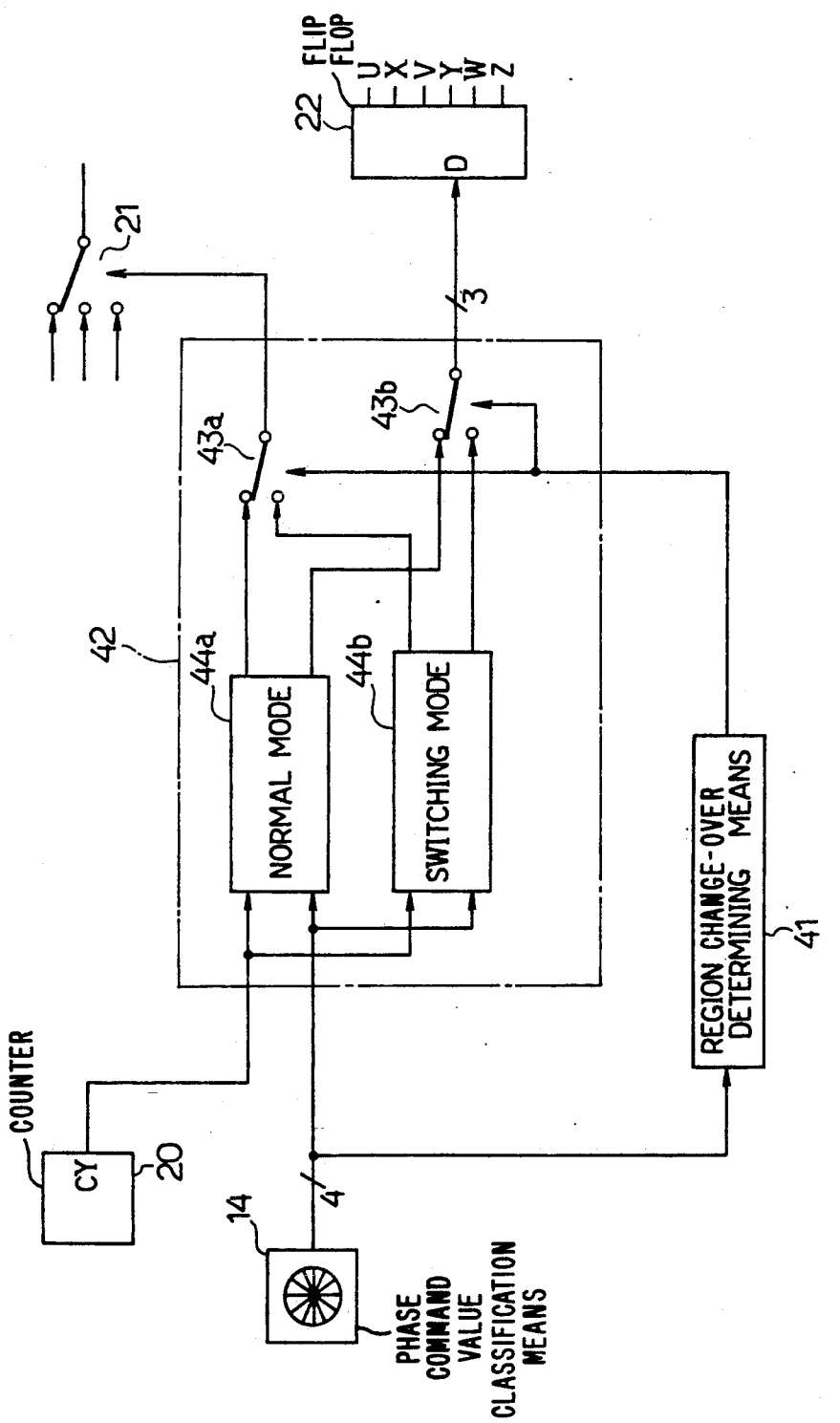
FIG. 8 is a block diagram of the switching pattern determining means shown in FIG. 7.

Furthermore, the following mechanism is added to the above-described three-phase PWM signal generating device. FIG. 8 illustrates in detail the switching pattern determining means 42 shown in FIG. 7. The phase command value $\theta^*$ to be classified by the phase command value classification means 14 is transferred from one of two unit regions between two kinds of voltage space vectors out of phase from each other by an electrical angle of $\pi/3$ from the other, each unit region being an angular region of an electrical angle of $\pi/6$. Such a change-over of the unit region to which the phase command value $\theta^*$ belongs occurs every electrical angle of $\pi/3$ since the unit region to which the phase command value $\theta^*$ belongs is between the adjacent two of six fundamental voltage vectors. Unit region changeover over determining means 41 determines occurrence of the change-over of the unit region to which the phase command value $\theta^*$ belongs. Based on the determination by the unit region change-over determining means 41, the switching pattern determining means 42 determines the output sequence of the switching patterns only in one control period $T_{SW}$ in a manner different from the normal manner. In the normal manner of determining the output sequence of the switching patterns, the switching pattern corresponding to the zero vector is disposed after or before the switching pattern having a longer holding time in consideration of the previous switching patterns, as described in the description of the prior art. This manner will be referred to as "a normal mode." On the other hand, when the unit region to which the phase command value $\theta^*$ belongs is changed, the zero vector is disposed at the start and end of one control period $T_{SW}$ so that the switching pattern corresponding to the zero vector is held for half ($t_0/2$) of the holding time $t_0$ calculated by the holding time calculating means 16. This manner will be referred to as "a change-over mode."

Figure 23:
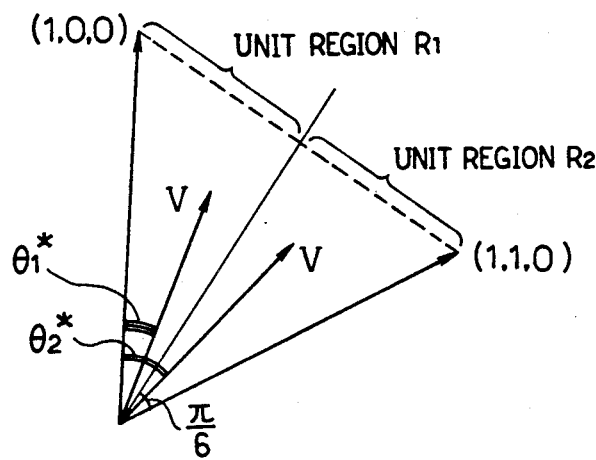
FIG. 23 is a vector diagram for explaining the operation of the conventional device in the transition of the unit region.
Figure 24:
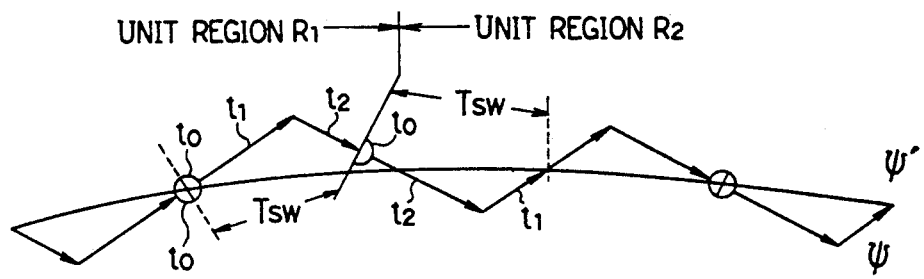
FIG. 24 shows a locus of the magnetic flux vector obtained from the sinusoidal waveform approximation by the conventional device of FIG. 23.
Figure 25:
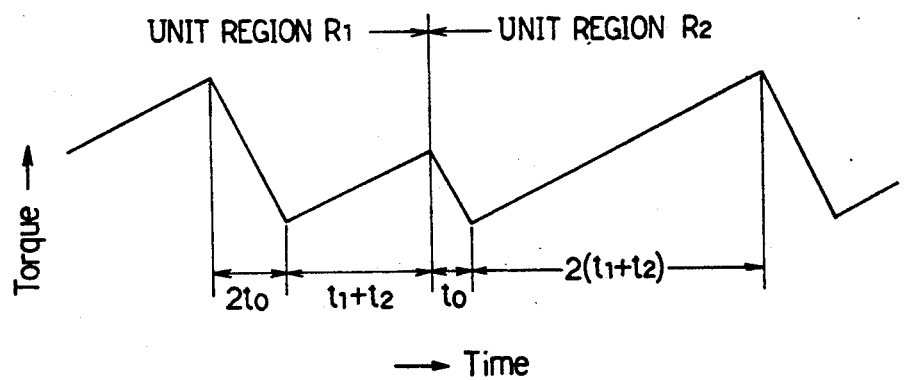
FIG. 25 is a torque waveform chart corresponding to the magnetic flux vector in FIG. 24.

The change-over mode will be described in detail with reference to FIGS. 23 and 9. The phase command value $\theta^*_1$ belongs to the unit region $R_1$ in the first and the switching pattern determining means 42 is in the normal mode. Accordingly, when the holding times of the switching patterns corresponding to the fundamental voltage vectors (1, 0, 0), (1, 1, 0) and the zero vectors are represented as $t_1$, $t_2$ and $t_0$, the relation $t_1 > t_2$ holds. As a result, the switching pattern corresponding to the zero vector (0, 0, 0) is first held for the time $t_0$ in the control period $T_{SW}$ and then, the switching pattern corresponding to the fundamental voltage vector (1, 0, 0) is held for the time $t_1$. Last, the switching pattern corresponding to the fundamental voltage vector (1, 1, 0) is held for the time $t_2$. See FIG. 9. When the phase is changed over from the unit region $R_1$ to the unit region $R_2$, this is determined by the change-over determining means 41. A normal mode circuit 44a is changed over to a change-over mode circuit 44b by selection switches 43a and 43b. When the phase command value $\theta^*_2$ is caused to belong to the unit region $R_2$ during the subsequent control period $T_{SW}$ and the normal mode is changed to the change-over mode, the switching pattern corresponding to the zero vector (1, 1, 1) is held for the time $t_0/2$ and then, the switching pattern corresponding to the fundamental voltage vector (1, 1, 0) is held for the time $t_2$ since $t_1 < t_2$. Further, the switching pattern corresponding to the fundamental voltage vector (1, 0, 0) is held for the time $t_1$ and last, the switching pattern corresponding to the zero vector (1, 1, 1) is held for the time $t_0/2$.

Figure 9:
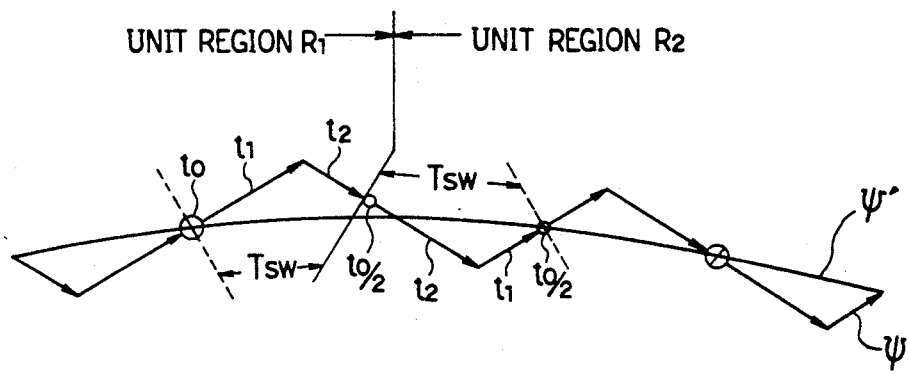
FIG. 9 is a view similar to FIG. 3 in the case of the fifth embodiment.
Figure 10:
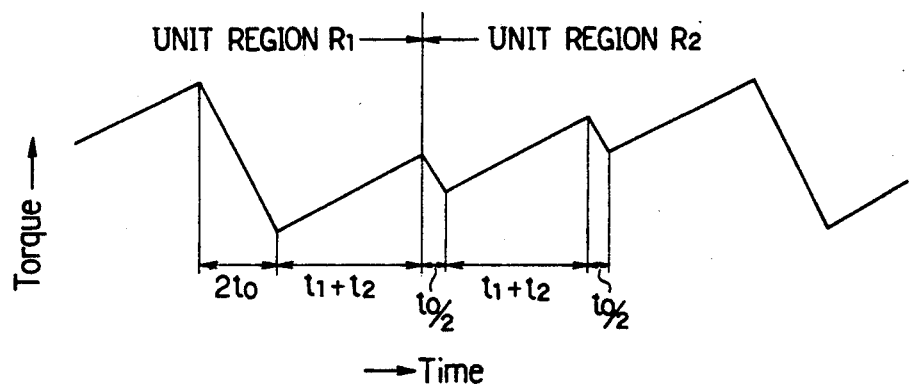
FIG. 10 is a torque waveform chart corresponding to the magnetic flux in FIG. 9.
Figure 26:
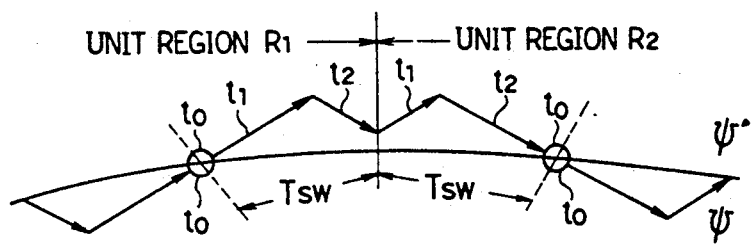
FIGS. 26 and 27 are views similar to FIGS. 24 and 25 showing another method of the sinusoidal waveform approximation respectively.
Figure 27:
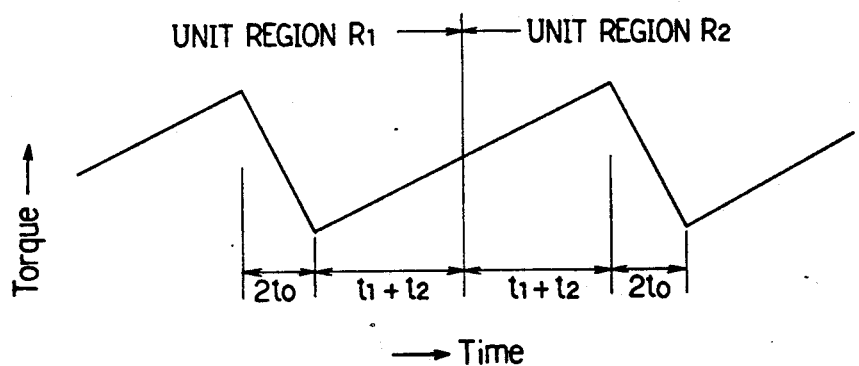
Figure 28:
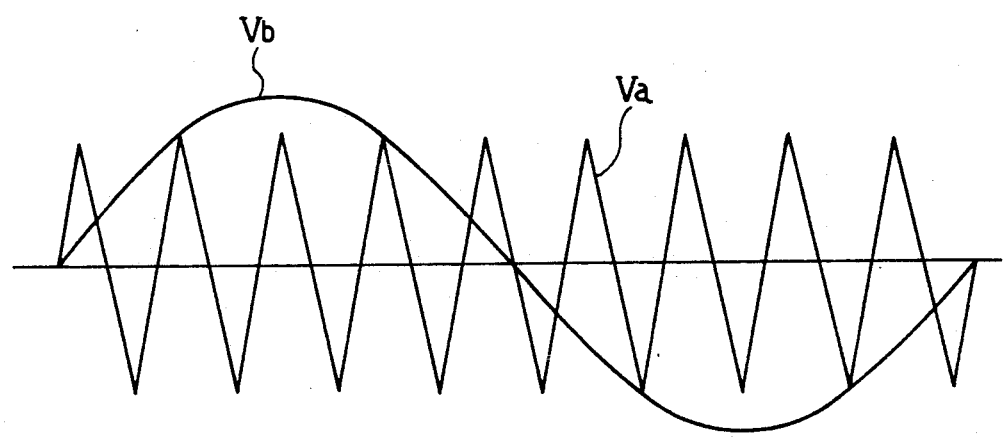
FIG. 28 is a voltage waveform chart for explaining the principle of the PWM signal generation.

FIGS. 9 and 10 illustrate a locus of the magnetic flux vector and the torque waveform in the above-described case respectively. As is obvious from the comparison of FIGS. 9 and 10 with FIGS. 26 and 27 respectively, both the distortion of the magnetic flux and that of the torque waveform can be improved in the embodiment. The arrangement of the above-described fifth embodiment may be applied to the three-phase PWM signal generating devices of the second, third and fourth embodiments shown in FIGS. 4 to 6 respectively.

Figure 11:
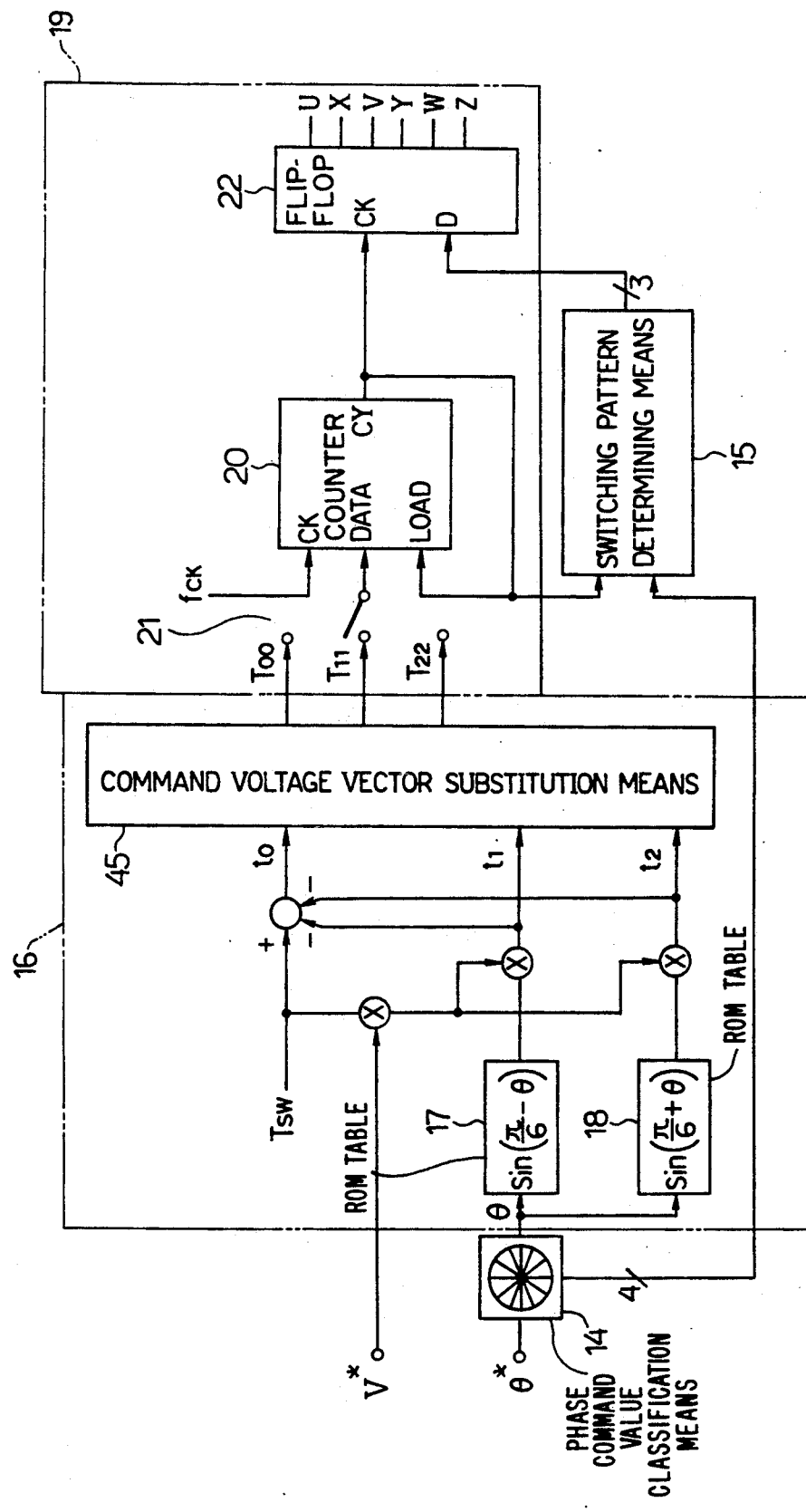
FIG. 11 is a view similar to FIG. 1 showing a sixth embodiment.

FIGS. 11 to 16 illustrate a sixth embodiment. The arrangement of the PWM signal generating device shown in FIG. 11 is substantially the same as that shown in FIG. 20 except for addition of command voltage vector substitution means 45 provided between the signal delivering portion for the switching pattern holding times $t_1$, $t_2$ and $t_0$ and the switch 21 for distributing the switching pattern holding times. Further, these holding times $t_1$, $t_2$, $t_0$ are calculated using the equation (1). When supplied with the switching pattern holding times $t_1$, $t_2$, $t_0$, the command voltage vector substitution means 45 performs a calculation in accordance with a program which will be described later so that actual holding times $t_{11}$, $t_{22}$ and $t_{00}$ are supplied to the timing means 19. The calculation is performed in accordance with a substitution program by the command voltage vector substitution means 45 when a particularly high voltage command value V* is supplied and the holding time $t_0$ of the zero vector takes a negative value.

Figure 13:
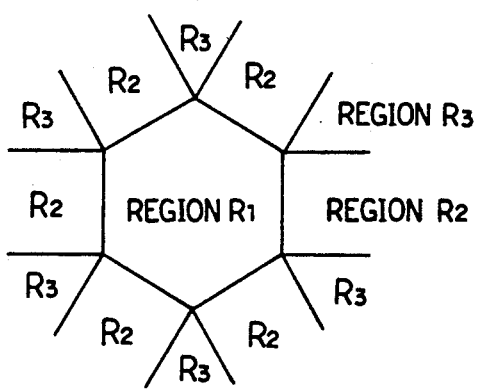
FIG. 13 shows the unit regions for explaining the determination of the region by the command voltage vector replacing means.

The operation of the above-described arrangement will be described. As shown in FIG. 13, the command voltage vector V can belong to one of the region $R_1$, i.e. a regular hexagonal PWM controlled region, the regions $R_2$ perpendicular to respective sides of the regular hexagon outside the region $R_1$, and the regions $R_3$ which are the other region outside the regions $R_1$.

Referring to FIG. 21, the PWM signal generating device operates as follows when the command voltage vector V corresponding to the phase command value $\theta^*$ and the voltage command value V* belongs to the region $R_1$ or the PWM controlled region. The phase command value classification means 14 classifies the unit region in accordance with the phase command value $\theta^*$ at that time. The phase command value classification means 14 delivers the result of classification to the switching pattern determining means 15 and further delivers data of the lead angle $\theta$ to the holding time calculating circuit 16. The holding time calculating circuit 16 calculates the time ratio represented by the equation (1) in the manner as described above and supplies the command voltage vector substitution means 45 with the holding times $t_1$, $t_2$, $t_0$ of the switching patterns corresponding to the fundamental voltage vectors and zero vector.

Figure 12:
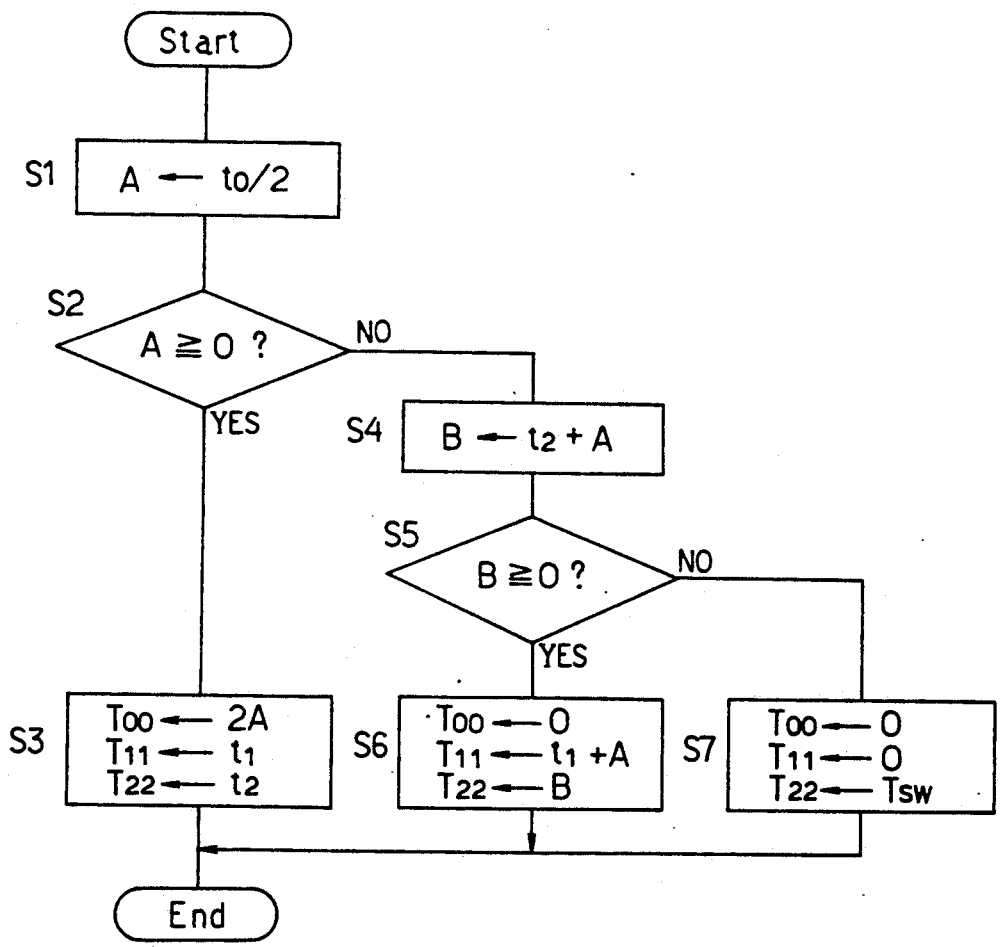
FIG. 12 is a flowchart for explaining the operation of the command voltage vector replacing means in the sixth embodiment.

Upon receipt of the holding times, the command voltage vector substitution means 45 starts the program shown in FIG. 12. First, the holding time $t_0$ of the switching pattern corresponding to the zero vector whose data is supplied thereto from the holding time calculating circuit 16 is divided by 2 and stores data of the obtained value as a comparison value A (step S1).

The command voltage vector substitution means 45 determines whether the obtained comparison value A is zero or above zero (step S2). In this case the command voltage vector V is within the PWM controlled region as described above, so that the holding time $t_0$ is a positive value. Accordingly, the command voltage vector substitution means 45 determines that the comparison value A is zero or above zero. Actual holding times $t_{11}$, $t_{22}$, $t_{00}$ are determined at step S3. The value obtained by doubling the comparison value A, that is, the value equal to $t_0$ is substituted for the holding time $t_{00}$. The holding times $t_1$, $t_2$ are substituted for the actual holding times $t_{11}$, $t_{22}$ respectively. In this case, consequently, the holding times from the holding time calculating circuit 16 are delivered as the actual holding times without any change.

Figure 14:
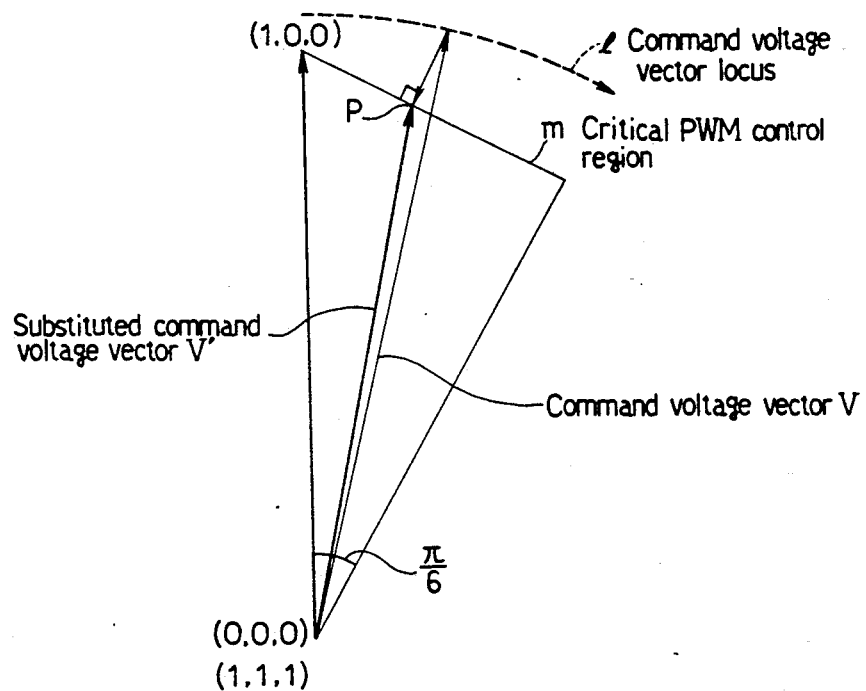
FIG. 14 is a vector diagram for explaining the sixth embodiment.

The PWM signal generating device operates as follows when the command voltage vector V is in the region $R_2$, that is, outside the PWM controlled region. When the holding time calculating circuit 16 calculates the holding times $t_0$, $t_1$, $t_2$ in accordance with the equation (1) in the same manner as described above, the holding time $t_0$ or the switching pattern corresponding to the zero vector takes a negative value. The broken line l in FIG. 14 shows a locus of the command voltage vector V in this case. FIG. 14 shows the case where the command voltage vector V has been determined to be in the region of the phase of $\pi/6$ containing the fundamental voltage vector (1, 0, 0). As is obvious from comparison of FIGS. 14 and 21, the holding time $t_0$ takes a negative value when it is calculated in accordance with the time ratio shown by the equation (1). When supplied with the negative holding time $t_0$, the command voltage vector substitution means 45 determines at step S2 that the comparison value A is not zero nor above zero and further that the comparison value A belongs to either the region $R_2$ or $R_3$, advancing to step S4. The command voltage vector substitution means 45 adds the comparison value A to the holding time $t_2$ supplied from the holding time calculating circuit 16 to obtain a comparison value B. The comparison value B is smaller than the holding time $t_2$ since the comparison value A is negative. The command voltage vector substitution means 45 determines whether or not the comparison value B is zero or above zero at step S5. Since the comparison value is positive, the substitution means 45 determines that the comparison value B is zero or above zero, advancing to step S6. Consequently, based on the comparison value B, it is determined at step S5 that the command voltage vector V is in the region $R_2$. At step S6, the comparison value B is substituted for the actual holding time $t_{22}$, the addition of $t_1$ and the comparison value A is substituted for the holding time $t_{11}$ and zero is substituted for the holding time $t_{00}$. Consequently, the command voltage vector V is replaced by a compensated command voltage vector V' (FIG. 14). In the physical phase of the above-described process, the value $t_0/2$ is subtracted from each of the holding times $t_1$, $t_2$ such that the command voltage vector V is transferred to the point P intersecting a perpendicular on the side m defining the limit of the PWM controlled region, whereby the command voltage vector V is replaced by the command voltage vector V' nearest to the maximum PWM controlled value.

When it is determined at step S5 that the comparison value B is not zero nor above zero or when the command voltage vector V is in the region $R_3$, the control period $T_{SW}$ is substituted for the holding time $t_{22}$ and zero is substituted for both holding times $t_{11}$ and $t_{00}$ at step S7. Consequently, the command voltage vector V is replaced by the nearest command voltage vector V' (not shown) by the substitution of all the fundamental vectors when the command voltage vector is in the region $R_3$.

Consequently, when the command voltage vector V shown in FIG. 14 is given, it is replaced by the command voltage vector V' nearest to the limit of the PWM controlled region, which is delivered to the inverter device so that the output voltage with the minimum waveform distortion near the sinusoidal waveform peak can be obtained.

Figure 15:
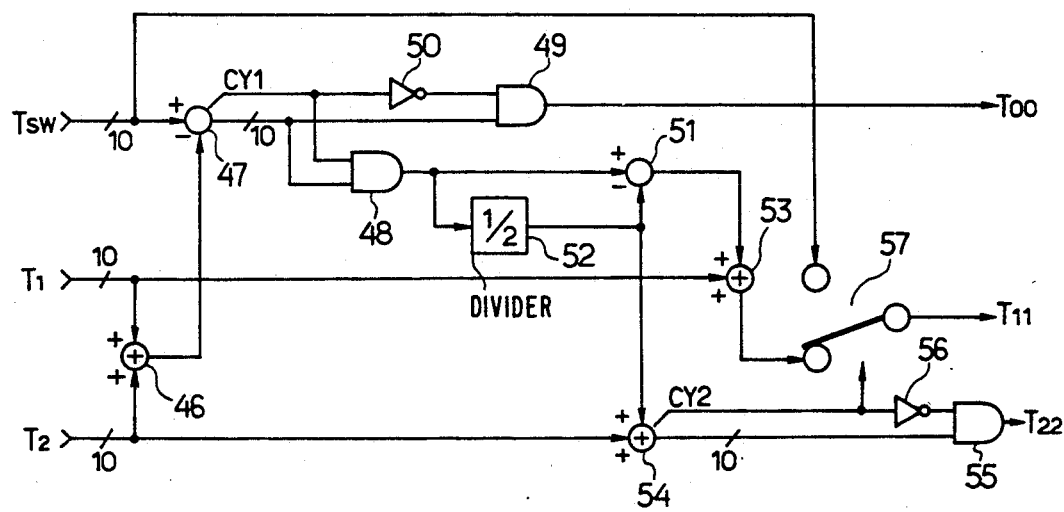
FIG. 15 is a connection diagram of the command voltage vector replacing means in a seventh embodiment.

FIG. 15 illustrates a seventh embodiment. The command voltage vector substitution means in this embodiment is composed of a logic circuit so as to perform a part of the function of the holding time calculating circuit 16 and the function of the command voltage vector substitution means 45 in the sixth embodiment. Each input data is processed as parallel 10-bit digital data.

Referring to FIG. 15, an adder 46 adds the holding times $t_1$ and $t_2$ and supplies the obtained value to a subtracter 47 as a subtraction value. The subtracter 47 subtracts the subtraction value from the adder 46 from the control period $T_{SW}$ and delivers the obtained value to one of the input terminals of each of the AND circuits 48 and 49 respectively. The subtracter 47 has a code determination terminal CY1 from which terminal a level "H" determination signal is delivered when the result of subtraction takes a negative value. The determination signal is supplied to the other input terminal of the AND circuit 48 and the other input terminal of the AND circuit 49 via an inverting circuit 50. An output of the AND circuit 48 is an actual holding time $t_{00}$ of the switching pattern corresponding to the zero vector. The subtracter 51 is supplied with the output of the AND circuit 48 and with the subtraction value via a divider 52 dividing the output of the AND circuit 48 into two equal parts. The subtracter 51 delivers the result of subtraction to an adder 53. The adder 53 adds the output of the subtracter 51 and the holding time $t_1$ and delivers the result of addition. An adder 54 adds the output of the divider 52 and the holding time $t_2$ and delivers the result of addition to an AND circuit 55. The adder 54 has a code determination terminal CY2 and delivers a level "L" determination signal to the other input terminal of the AND circuit 55 via an inverting circuit 56 when the result of addition takes a negative value. The output of the AND circuit 55 is an actual holding time $t_{22}$. A change-over switch 57 is provided so that the output of the adder 53 is usually utilized for the actual holding time $t_{11}$ and the control period $T_{SW}$ is utilized for the holding time $t_{11}$ when the level "L" determination signal is produced from the adder 54.

In operation, when the command voltage vector V is in the region $R_1$, the subtracter 47 operates to subtract the result of addition $(t_1 + t_2)$ from the adder 46 from the control period $T_{SW}$. The determination signal is at the level "L" since the result of subtraction $t_0(mT_{SW} - t_1 - t_2)$ is not negative. As a result, the output of the AND circuit 49, that is, the result of subtraction $t_0$ by the subtracter 47 is delivered as the holding time $t_{00}$. In this case the output of the AND circuit 48 is cut off since the determination signal generated by the subtracter 47 is at the level "L" and accordingly, the input to the adders 53, 54 is zero. The output $t_2(t_2 > 0)$ of the adder 54 is delivered as the holding time $t_{22}$ via the AND circuit 55. Further, the output $t_1$ of the AND circuit 53 is delivered to the change-over switch 57. Since the determination signal from the AND circuit 54 is at the level "L," the output $t_1$ is delivered as the holding time $t_{11}$ from the change-over switch 57.

When the command voltage vector V is in the region $R_2$, the result of substraction by the subtracter 47 takes a negative value. Consequently, the output of the AND circuit 49 is cut off and the holding time $t_{00}$ of the switching pattern corresponding to the zero vector is zero. The negative result of subtraction ($t_0$) is delivered from the AND circuit 48. As a result, the adder 53 delivers the result of addition of $t_1$ and $t_0/2$ and the adder 28 delivers the result of addition of $t_2$ and $t_0/2$. Since the output of the adder 54 is not negative, it is delivered as the holding time $t_{22}$. The output of the adder 53 is delivered as the holding time $t_{11}$ via the change-over switch 57.

When the command voltage vector V is in the region $R_3$, the result of addition by the adder 54 takes a negative value. The output of the AND circuit 55 is cut off. The determination signal is at the level "L" and the change-over switch 57 is switched. Consequently, the control period $T_{SW}$ is rendered the holding time $t_{11}$ and the holding times $t_{00}$ and $t_{22}$ are rendered zero. Thus, the same effect can be achieved in the seventh embodiment as in the sixth embodiment.

Figure 16:
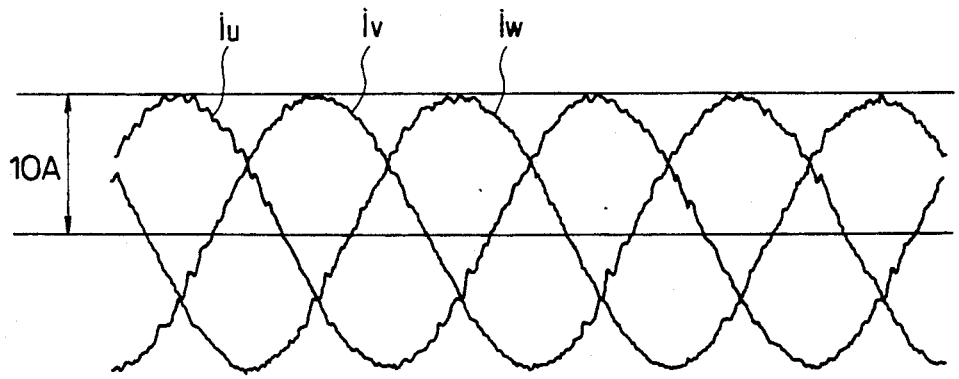
FIG. 16 is a waveforms chart showing three-phase approximate sinusoidal waveforms in the prior art.
Figure 17:
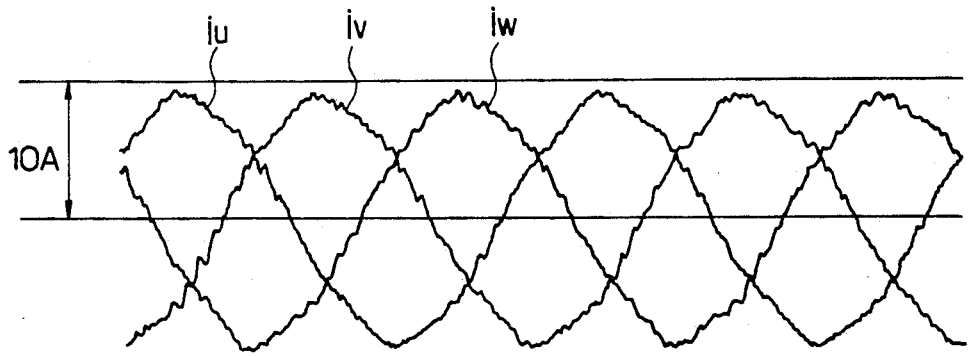
FIG. 17 is a waveform chart showing three-phase approximate sinusoidal waveforms in the sixth embodiment.

FIGS. 16 and 17 show waveforms of the outputs of the inverter devices obtained by the sixth and seventh embodiments by way of simulation. FIGS. 16 and 17 also show phase currents for comparison in the case where the same load torque is applied to the three-phase induction motor. FIG. 16 illustrates the prior art and FIG. 17 the embodiments of the present invention. As obvious from comparison, the current peak value and the current effect value are smaller in the present invention than in the prior art. This shows that torque is produced by a lesser amount of current since the fundamental wave output voltage is high, whereby high torque effect is achieved.

Although the present invention has been applied to the inverters of the open loop control type in the foregoing embodiments, the invention may be applied to the inverter of the current control type, in which case high current follow-up performance can be achieved.

The foregoing disclosure and drawings are merely illustrative of the principles of the present invention and are not to be interpreted in a limiting sense. The only limitation is to be determined from the scope of the appended claims.

We claim:

1. In an inverter device comprising:

an inverter main circuit including six bridge-connected switching elements which can be turned on and off in predetermined patterns so that a dc voltage supplied from an external source is converted to a three-phase ac approximately sinusoidal voltage and a three-phase PWM signal generating device connected to the inverter main circuit for generating switching pattern signals for turning on and off the switching elements in order to provide six kinds of switching patterns corresponding to six fundamental voltage vectors out of phase from one another by an electrical angle of $2\pi/6$, respectively, and switching patterns corresponding to a zero vector corresponding to an "on" or "off" state of substantially all the switching elements so that the inverter main circuit generates an approximately sinusoidal output voltage waveform, the three-phase PWM signal generating device comprising phase command value classification means for classifying a phase command value $\theta^*$, pertaining to a voltage command value $V^*$, into one of a plurality of unit regions, calculating a lead angle in the one unit region into which the phase command value is classified, and generating corresponding output information representative of the result of the classification and the lead angle, wherein the phase command value classification means obtains the plurality of unit regions by dividing an electrical angle of $2\pi$ into a plurality of equal regions, switching pattern determining means supplied with the output information of the phase command value classification means for setting the switching patterns corresponding to two kinds of fundamental voltage vectors corresponding to the one unit regions to which the phase command value is classified and the zero vector, the fundamental voltage vectors being out of phase from each other by an electrical angle of $\pi/3$, the switching pattern determining means further setting an output sequence of the set switching patterns, the switching pattern determining means inserting the switching pattern corresponding to the zero vector into each of the two kinds of switching patterns once during formation of each of the two kinds of switching patterns, holding time calculating means supplied with the output information of the phase command value classification means for calculating a holding time of each of the switching patterns corresponding to the two kinds of fundamental voltage vectors and the zero vector, based on the lead angle of the phase command value $\theta^*$ belonging to the one unit region and the supplied voltage command value $V^*$, and generating signals representative of the calculated holding times, and timing means supplied with the signals representative of the calculated holding times and connected to the switching pattern determining means for holding a formation state of each set switching pattern calculated by the holding time calculating means.

2. A three-phase PWM signal generating device according to claim 1, wherein the switching pattern determining means forms two switching patterns of the same kind before and after the formation of the switching pattern corresponding to the zero vector, respectively.

3. A three-phase PWM signal generating device according to claim 1, wherein the switching pattern determining means forms the switching pattern corresponding to the zero vector by inverting one of three switching elements corresponding to each switching pattern into which the switching pattern corresponding to the zero vector is inserted.

4. In an inverter device comprising:

an inverter main circuit including six bridge-connected switching elements which can be turned on and off in predetermined patterns so that a dc voltage supplied from an external source is converted to a three-phase ac approximately sinusoidal voltage and a three-phase PWM signal generating device connected to the inverter main circuit for generating switching pattern signals for turning on and off the switching elements in order to provide six kinds of switching patterns corresponding to six fundamental voltage vectors out of phase from one another by an electrical angle of $2\pi/6$, respectively, and switching patterns corresponding to a zero vector corresponding to an "on" or "off" state of substantially all the switching elements so that the inverter main circuit generates an approximately sinusoidal output voltage waveform, the three-phase PWM signal generating device comprising phase command value classification means for classifying a phase command value $\theta^*$, pertaining to a voltage command value $V^*$, into one of a plurality of unit regions, calculating a lead angle in the one unit region into which the phase command value is classified, and generating corresponding output information representative of the result of the classification and the lead angle, wherein the phase command value classification means obtains the plurality of unit regions by dividing an electrical angle of $2\pi$ into a plurality of equal regions, switching pattern determining means supplied with the output information of the phase command value classification means for setting the switching patterns corresponding to two kinds of fundamental voltage vectors corresponding to the one unit region to which the phase command value is classified and the zero vector, the fundamental voltage vectors being out of phase from each other by an electrical angle of $\pi/3$, the switching pattern determining means further setting an output sequence of the set switching patterns, the switching pattern determining means forming the zero vector state at the times of the start and end of a section in which the calculated lead angle of the phase command value $\theta^*$ advances $\pi/3$ and at the time of a change-over of the unit region so that the sum of the holding time of the zero vectors formed two times becomes approximately equal to the holding time of the other zero vector, holding time calculating means supplied with the output information of the phase command value classification means for calculating a holding time of each of the switching patterns corresponding to the two kinds of fundamental voltage vectors and the zero vector, based on the lead angle of the phase command value $\theta^*$ belonging to the one unit region and the supplied voltage command value $V^*$, and generating signals representative of the calculated holding times, timing means supplied with the signals representative of the calculated holding times and connected to the switching pattern determining means for holding a formation state of each set switching pattern during the holding time of each switching pattern calculated by the holding time calculating means, and unit region change-over determining means connected between the phase command value classification means and the switching pattern determining means for determining that the phase command value $\theta^*$ has transferred from a unit region in the vicinity of one of the two kinds of fundamental voltage vectors.

5. A three-phase PWM signal generating device according to claim 4, wherein the two zero vector states occur at the start and the end of at least a first half of one control period respectively and the holding time of the zero vector occurring at the end of the first half of the control period is approximately half of the holding time of the zero vector occurring at the start of the first half of the control period.

6. A three-phase PWM signal generating device according to claim 4, wherein each unit region is defined to have an angle dividing, into two parts, the phase difference between the two kinds of fundamental voltage vectors out of phase from each other by an electrical angle of $\pi/3$.

7. In an inverter device comprising:

an inverter main circuit including six bridge-connected switching elements which can be turned on and off in predetermined patterns so that a dc voltage supplied from and external source is converted to a three-phase ac approximately sinusoidal voltage and a three-phase PWM signal generating device connected to the inverter main circuit for generating switching pattern signals for turning on and off the switching elements in order to provide six kinds of switching patterns corresponding to six fundamental voltage vectors out of phase from one another by an electrical angle of $2\pi/6$, respectively, and switching patterns corresponding to a zero vector corresponding to an "on" or "off" state of substantially all the switching elements so that the inverter main circuit generates an approximately sinusoidal output voltage waveform, the three-phase PWM signal generating device comprising switching pattern determining means for determining a holding time of each of the six kinds of switching patterns and an output sequence of the switching patterns, based on a command voltage vector including a supplied voltage command value $V^*$ and a supplied phase command value $\theta^*$, and command voltage vector substituting means for supplying to the switching pattern determining means a firs command voltage vector, instead of a command voltage vector received from an external source, when the command voltage value of the received command voltage vector exceeds a PWM control region where the fundamental voltage vector is a radius, the first command voltage vector being nearest to the limit of the PWM control region.

8. A three-phase PWM signal generating device according to claim 7, wherein when the received command voltage vector exceeds the PWM control region and the phase command value of the received command voltage vector approximates the fundamental voltage vector, the first command voltage vector is substituted for a vector having the magnitude of the fundamental voltage vector.

9. In an inverter device comprising:

an inverter main circuit including six bridge-connected switching elements which can be turned on and off in predetermined patterns so that a dc voltage supplied from an external source is converted to a three-phase ac approximately sinusoidal voltage and a three-phase PWM signal generating device connected to the inverter main circuit for generating switching pattern signals for turning on and off the switching elements in order to provide six kinds of switching patterns corresponding to six fundamental voltage vectors out of phase from one another by an electrical angle of $2\pi/6$, respectively, and switching patterns corresponding to a zero vector corresponding to an "on" or "off" state of substantially all the switching elements so that the inverter main circuit generates an approximately sinusoidal output voltage waveform, the three-phase PWM signal generating device comprising switching pattern determining means for determining a holding time of each of the six kinds of switching patterns and an output sequence of the switching patterns, based on a command voltage vector including a supplied voltage command value $V^*$ and a supplied phase command value $\theta^*$, and command voltage vector substituting means for supplying to the switching pattern determining means a first command voltage vector, instead of a command voltage vector received from an external source, the command voltage vector substituting means comprising determining means for determining to which one of first, second and third regions the received voltage command vector $V^*$ belongs, the first region being defined by the six kinds of fundamental voltage vectors into an orthohexagonal configuration, the second region extending from the first region vertically relative to each side of the first region, the third region extending in the direction of each fundamental voltage vector, and means for converting the received voltage command vector $V^*$ to a first command voltage vector nearest to a PWM control region when it is determined by the determining means that the received voltage command vector $V^*$ belongs to the second region, said means converting the received voltage command vector to the magnitude of the fundamental voltage vector when it is determined by the determining means that the received voltage command vector belongs to the third region, said means holding the received, voltage command vector when it is determined by the determining means that the received voltage command vector belongs to the first region.

* * * * *